United States Patent [19]

Otrhalek et al.

[11] 4,085,000

[45] Apr. 18, 1978

[54] METHOD OF RECOVERING TALL-OIL SOAP FROM KRAFT BLACK LIQUOR

[75] Inventors: Joseph V. Otrhalek, Dearborn; Gilbert Stephen Gomes, Southgate; Gunther Hans Elfers, Grosse Ile, all of Mich.

[73] Assignee: BASF Wyandotte Corporation, Wyandotte, Mich.

[21] Appl. No.: 759,070

[22] Filed: Jan. 13, 1977

[51] Int. Cl.² ............................................. D21C 11/00
[52] U.S. Cl. ...................................... 162/16; 260/97.7
[58] Field of Search ............. 162/16, 29, 168 R, 30 K; 260/97.7, 29.6 T, 29.6 TA; 526/318

[56] References Cited

U.S. PATENT DOCUMENTS 3,873,417  3/1975  Otrhalek et al. ................. 162/168 R
3,880,704  4/1975  Ziegler et al. ........................ 162/16

Primary Examiner—S. Leon Bashore
Assistant Examiner—William F. Smith
Attorney, Agent, or Firm—John W. Linkhauer; Robert E. Dunn; Bernhard R. Swick

[57] ABSTRACT

As a tall-oil-soap skimming aid, there is added to black liquor resulting from the pulping of coniferous trees a terpolymer of (a) an alpha-beta-unsaturated acid, (2) an alkylate of an alpha-beta-unsaturated acid, and (3) allyl alcohol. The acid contains 3 to 4 carbon atoms and comprises about 60 to about 88 percent by weight of the terpolymer. The alkylate comprises about 6 to 28 parts by weight of the terpolymer, being an ester of the abovementioned acids, the ester having an alkyl portion containing 1 to 18 carbon atoms. Allyl-alcohol units are present in the terpolymer to an extent of 4.5 to 20 weight percent. The terpolymer can be produced by free-radical polymerization in accordance with the customary procedures. With the use of such a copolymer, the proportion of tall oil recovered from black liquor is very substantially increased.

8 Claims, No Drawings

METHOD OF RECOVERING TALL-OIL SOAP FROM KRAFT BLACK LIQUOR

BACKGROUND OF THE INVENTION

1. Field of the Invention

This invention relates to a particular terpolymer produced by free-radical polymerization and its use for the separation of tall-oil soap from liquors resulting from the pulping of wood, especially that of trees readily commercially available and rich in resins and oil, such as Douglas fir and pine.

2. Description of the Prior Art

It is known that in the kraft or sulfate pulping process, tall oil can be recovered as a major by-product. Particularly in the pulping of pine or Douglas fir, tall oil, in the form of its sodium salt, is present in the relief liquors which are drawn from the digester. From these relief liquors, also called black liquor, some water is evaporated, and then the liquor is transferred to a skimming tank. The tall-oil soap tends to rise to the surface, and it can be readily skimmed off. A certain amount of tall-oil soap can be recovered in that way without further effort. Additional tall-oil soap remains in the black liquor, and this invention is concerned with how recovery of the remaining tall-oil soap can be achieved.

SUMMARY OF THE INVENTION

It has now been found that by the addition of small amounts of terpolymers of unsaturated carboxylic acids, esters of unsaturated carboxylic acids, and allyl alcohol, there may be obtained a substantial increase in the efficiency of the process of skimming tall-oil soap from black liquor in a pulping process. The finding is surprising and unexpected, since such polymers are usually known for their properties as dispersants, whereas, in contrast, in this case a phase separation is achieved. The mechanism of the separation of tall-oil soap in the presence of the terpolymers of the present invention is not well understood, but it yields a commercially valuable result.

DESCRIPTION OF THE PREFERRED EMBODIMENTS

The terpolymer according to the present invention is an alkali-neutralized, free-radical-polymerized polymer made up of units derived from (1) an alpha-beta-unsaturated acid, (2) an alkylate of an alpha-beta-unsaturated and (3) allyl alcohol. More particular, the acid is an alpha-beta-unsaturated acid, and it contains 3 to 4 carbon atoms. Included within this group of acids are acrylic acid, methacrylic acid, crotonic acid, and isocrotonic acid, with the first two acids being preferred. The amount of acid employed in preparing the terpolymer of this invention, on the basis of a total of 100 parts by weight, is from about 60 to about 88 parts by weight, and preferably, from about 75 to about 88 parts by weight.

The alkylate units contained in the terpolymer of this invention are esters of the acids mentioned above. Again, the preferred acids are acrylic acid and methacrylic acid. The alkyl portion of the alkylate monomer contains from 1 to 18 carbon atoms, and more preferably, from 1 to 10 carbon atoms. Linear or normal alkyl, branched alkyl, hydroxy alkyl, or cycloalkyl radicals may be used. Illustrative of the alkyl groups used are methyl, hydroxymethyl, ethyl, hydroxyethyl, propyl, isopropyl, butyl, 2-ethylhexyl, cyclohexyl, nonyl, octyl, dodecyl and stearyl. On the basis of 100 parts by weight of the terpolymer, alkylated acid is present in the terpolymer in an amount from about 6 to about 28 parts, and preferably, from about 6 to about 15 parts.

The third component in the terpolymer is allyl alcohol, which is present, based on 100 parts, in an amount from about 4.5 parts to about 20 parts, and preferably from about 6 to about 15 parts by weight.

The terpolymers are prepared by free-radical polymerization in an aqueous medium at a temperature of from just above the freezing point up to the reflux temperature of the aqueous reaction mixture. More practical operating temperatures are in the range of about 50° C to about 100° C, with a range of about 60° C to about 90° C being particularly preferred. Polymerization in accordance with this invention may be conducted at atmospheric pressure, or at a higher (autogeneous) pressure.

The polymerization is generally conducted for a period of two to eight hours, a period of three to five hours being very satisfactory. The foregoing details, the initiators discussed below, and other similar details are well known to those skilled in the polymer art, and for the sake of brevity they need not be discussed further.

It has been found preferable to prepare an aqueous solution of acid, ester, and alcohol, and then charge the solution incrementally to the reaction vessel, along with incremental additions of an aqueous solution of the initiator, at such a rate so as to maintain the desired reaction temperature evenly. The solids content of the reaction system may range from about 20 to about 50 percent by weight. Thirty percent by weight has been found very satisfactory from the point of view of obtaining a viscosity low enough to permit easy handling of the resulting polymer solution.

Any of the compounds known to generate free radicals and which are soluble at effective concentrations in the aqueous polymerization medium may be used as the polymerization initiator or initiators in practicing this invention. Examples of useful polymerization initiators include the alkali-metal and ammonium persulfates, perborates, or percarbonates; hydrogen peroxide; organic peroxides such as benzoyl peroxide, cumene hydroperoxide, tertiary butyl peroxide, tertiary butyl perbenzoate, acetyl benzoyl peroxide; tertiary butyl peracetate; and tertiary butyl peroxyisobutyrate. Ammonium, potassium, and sodium persulfates are particularly preferred. Organic peroxides may be used in combination with these inorganic peroxidic catalysts. Azonitrile compounds, such as those described in U.S. Pat. No. 2,471,959, may be used also.

Generally, the proportion of polymerization initiator is in the range of 0.1% to 8.0%, based on the weight of the acid plus alkylate charged, and preferably from 1% to 3%, the foregoing percentages being by weight.

The initiator may also be a peroxidic catalyst activated with a reducing agent to provide a redox system. Examples of useful reducing agents include water-soluble bisulfites, such as sodium metabisulfite; sulfites; hydrosulfites; and thiosulfates. The redox system may be further activated by the presence of polyvalent metal ions, for example, ferrous ions at concentrations on the order of magnitude of several parts per million, or with tertiary amines which are soluble in the reaction mixture.

The proportion of reducing agent included in the polymerization-initiator combination ordinarily ranges up to 3%, based on the weight of the monomers, and it is preferably in the range of 0.02% to 1% on this basis. In the inorganic redox system of persulfate and bisulfite, the weight ratio can vary from one to ten parts of persulfate per part by weight of bisulfite.

The polymerization product has an acidic pH and can be neutralized with alkaline materials, such as ammonia or ammonium hydroxide; monoalkylamines or dialkylamines containing 1 to 6 carbon atoms in each alkyl group; and alkali-metal hydroxides, for example, potassium hydroxide or sodium hydroxide, that form water-soluble neutralization products. Preferably, the neutralizing agent will be ammonia, ammonium hydroxide, potassium hydroxide, or sodium hydroxide. The neutralizing agent is added to the polymer solution until a final pH of about 7.5 to about 8.5 is obtained. Thus neutralized, the polymer solution has improved storage stability, and possible metal-corrosion problems in a storage container are minimized.

The resulting polymer solution is adjusted, as necessary, to have a total solids content of polymer of between about 20 and about 50 weight percent. Using a lower solids content gives a material of lower viscosity, which may prove to be of advantage in improving the handling characteristics; on the other hand, it is usually desirable to use a solids content as high as possible, to avoid the cost of shipping and handling water.

After having been prepared as described above, the terpolymer is used in a suitable way. It may be added to black liquor or the like in some amount such as 10 to 500 parts by weight per one million parts by weight of such liquor. Usually the terpolymer is added to liquor resulting from the pulping of Douglas fir or pine, inasmuch as these are softwood (coniferous) trees which are commercially readily available and which contain in their wood a considerable proportion of oil, but the invention is not necessarily limited to the treatment of liquors from the pulping of these woods. Wood from other conifers also contains resin or oil. Indeed, even the hardwoods contain such resin or oil in a small proportion, and it may be desirable in some cases to use a terpolymer according to the present invention to improve the recovery of tall oil from a liquor resulting from pulping of a hardwood.

The following examples are included to illustrate the preparation of the terpolymers of the present invention and the use thereof, but the examples are to be interpreted as illustrative, and not in a limiting sense. Unless otherwise noted, all parts are by weight, and all temperatures are in degrees Centigrade.

EXAMPLE 1

A one-liter, three-necked flask equipped with stirrer, thermometer, addition funnels, reflux condenser, and heat-exchange equipment was charged with 236 grams of water. A mixture of 207 grams of acrylic acid, 23 grams of butyl acrylate, and 11.5 grams of allyl alcohol (solution I) and 115 grams of an aqueous solution containing 6% of potassium persulfate (solution II) was added concurrently to the water at 80° to 85° over three and a half hours.

The reaction product was then neutralized with 175 grams of an aqueous solution containing 28 weight percent of ammonia. A clear viscous solution was obtained, which had a Brookfield viscosity of 1,800 centipoises. When used as indicated below in Example 5, the product was effective as a skimming aid for use in the recovery of tall-oil soap.

EXAMPLE 2

A five-liter, three-necked flask equipped with stirrer, thermometer, addition funnels, reflux condenser, and heat-exchange equipment was charged with 1,230 grams of water. A mixture of 1,035 grams of acrylic acid, 115 grams of butyl acrylate, and 115 grams of allyl alcohol (solution I) and 575 grams of an aqueous solution containing 6% of potassium persulfate (solution II) was added concurrently to the water at 80° to 85° over a period of three hours. The reaction product was then neutralized with 1,150 grams of an aqueous solution containing 50% of sodium hydroxide. A clear solution having a total active solids content of 30% was obtained. It exhibited a pH of 7.7, and Brookfield viscosity of 3,040 centipoises (Spindle No. 4, 60 revolutions per minute), and a density of 1.25 grams per cubic centimeter. When used as indicated below in Example 5, the product was effective as a skimming aid for the recovery of tall oil-soap.

EXAMPLE 3

Following the procedure of Example 1, there was prepared a terpolymer which was based on 82 parts of acrylic acid, 9 parts of methyl methacrylate, and 9 parts of allyl alcohol. The total solids content of the polymer solution was 30% and the solution was neutralized with an aqueous solution containing 50% of sodium hydroxide. The solution had a viscosity of 2,560 centipoises. When used as indicated below in Example 5, the product was effective as a skimming aid in the recovery of tall-oil soap.

EXAMPLE 4

Following again the procedure of Example 1, there was prepared a terpolymer based on 64 parts of acrylic acid, 27 parts of hydroxyethyl methacrylate, and 9 parts of allyl alcohol. The total solids content of the polymer solution was 30%, and neutralization was conducted as in Example 3. There was thus obtained a solution having a Brookfield viscosity of 2,648 centipoises. When used as indicated in Example 5, the product was effective as a skimming aid for the recovery of tall-oil soap.

EXAMPLE 5

This example demonstrates the effective use of the product of Example 2 as a skimming aid for the recovery of tall-oil soap. The product of Example 2 was added, at concentrations ranging from 10 to 100 parts per million, to samples of black liquor. The samples had been obtained at the outlet of a tall-oil-soap skimming system of a pulp mill. The samples were then subjected to a laboratory-scale tall-oil-soap skimming procedure, and the residual tall-oil soap after skimming was determined by employing a standardized tall-oil extraction method, which will now be described.

Black liquor (100 milliliters) is diluted in 1,000 milliliters of distilled water. Under these conditions, the sample contains about 5% solids. The sample is stirred until all soaps are dissolved.

Total solids content is determined by drying 10 milliliters of the solution of an iron crucible at 100° to 110° for 24 hours. To a separatory funnel of suitable capacity such as 500 milliliters, 100 milliliters of the dilute sample are added. It is important that the funnel have ground-glass joints, with no silicone grease or other lubricant of any type. Five milliliters of hydrogen peroxide reagent, made by mixing 3 volumes of commercial 30% $H_2O_2$ with 2 volumes of water, are added, and the funnel is shaken vigorously for 45 seconds. Within one minute, five milliliters of sodium sulfite reagent, made by dissolving 20 grams of sodium sulfite in 100 milliliters of water, are added, and the funnel is shaken vigorously for 1 minute. Then 10 milliliters of hydrochloric acid reagent (1:1 concentrated acid:water) are added, and the funnel is shaken and vented continuously for 1 minute. Next, 250 milliliters of an acetone-methanol reagent (1:4 methanol: acetone, by volume) are added, and the contents of the funnel are mixed thoroughly for 30 seconds.

Next, 150 milliliters of petroleum ether having a boiling range of 40° to 60° are added, and the contents of the funnel are shaken for about 2 minutes.

The contents of the funnel are permitted to separate for about 5 minutes, and then the lower (aqueous) phase is transferred to a 600-milliliter beaker.

The petroleum-ether phase remaining in the funnel is washed twice with 25-milliliter portions of a water-acetone-methanol reagent (2:1:1 acetone:water:methanol by volume), the washings being added to the aqueous phase in the 600-milliliter beaker.

The petroleum-ether phase is then moved to a 400-milliliter beaker and evaporated on a steam bath at 80° C. The aqueous phase, including all solids, is returned to the separator funnel and extracted with 100 milliliters of petroleum ether. After the aqueous phase is returned to the 600-milliliter beaker, the petroleum ether is washed with the water-acetone-methanol reagent, as described above, and the petroleum-ether extract is combined with the petroleum-ether phase on the steam bath as the washings are added to the aqueous phase in the 600-milliliter beaker.

Evaporation of the petroleum-ether extract is continued just until the oil appears on the bottom of the flask, and then 25 milliliters of isopropyl alcohol are added to redissolve the oil, and the dissolved oil is filtered through coarse filter paper into a 100-milliliter beaker. The 400-milliliter beaker is washed thoroughly with isopropyl alcohol, the washings being poured over the filter paper, which is then washed with isopropyl alcohol until the final filtrate volume is approximately 50 milliliters. Then one milliliter of 1% phenolphthalein solution is added, and the mixture is titrated with alcoholic KOH solution of about 0.05 normal, the end point being taken at the point where the first pink color persists for 30 seconds.

This yields a weight of tall oil, assuming an acid number of 172, in accordance with the equation $$W = \frac{A \times N \times 56.1}{172},$$

where W equals the weight of tall oil in grams, A equals the number of milliliters of alcoholic KOH used, and N equals the normality of the alcoholic KOH used.

This makes it possible to calculate the percent of tall oil on a liquor-solids basis, using the equation $$P = 10C/D,$$

where P equals percent tall oil on a liquor-solids basis, C equals weight of tall oil in grams, and D equals grams of solids in 10 milliliters of dilute black liquor.

The results tabulated below indicate that when a product such as that of Example 2 is added, even at levels as low as 10 parts per million, there is a reduction in the content of tall oil retained in the black liquor after skimming. The effectiveness of the addition increases when higher concentrations are used.

Table I

| Concentration of Additive, ppm. | Tall-Oil Content in Black Liquor After Skimming, Weight %, Solids Basis | Additional Tall Oil Removed, % |
| --- | --- | --- |
| None (Control) | 1.41 | 0 |
| 10 | 1.23 | 12.8 |
| 20 | 1.24 | 12.1 |
| 50 | 0.96 | 31.9 |
| 100 | 0.92 | 34.7 |

EXAMPLE 6

The product of Example 2 was used as a tall-oil-soap skimming aid. The product was added at a concentration of 100 parts per million to the black liquor of a pulp mill at the inlet of the skimmer system. Both at the inlet and the outlet of the skimmer system, the concentration of tall-oil soap was determined. When the product of Example 2 was used at 100 parts per million, 30.0 percent, as an average, of the tall-oil soap was removed from the black liquor, but when no additive was used, only 11.5 percent of the tall-oil soap was removed. Thus, the efficiency of the removal of tall-oil soap was nearly trebled by the use of 100 parts per million of the product of Example 2.

EXAMPLE 7

The product of Example 2 was added to the black liquor from the Kamyr Digester of a pulp mill, at a concentration of 20 parts per million. The addition of the product of Example 2 at this concentration doubled the recovery of tall-oil soap from the black liquor.

While we have shown and described herein certain embodiments of the present invention, it is intended that there be covered as well any change or modification therein which may be made without departing from the spirit and scope of the invention.

The embodiments of the invention in which an exclusive property or privilege is claimed are defined as follows:

1. A method of recovering tall-oil soap from a black liquor from a sulfate kraft pulping step, produced in the pulping of wood from a coniferous tree, said method comprising mixing with said liquor about 10 to 500 parts by weight, per one million parts by weight of said liquor, of a terpolymer consisting essentially of units which are:
   (a) about 60 to about 88 parts by weight from an alpha-beta-unsaturated acid containing 3 to 4 carbon atoms,
   (b) about 6 to about 28 parts by weight from an alkylate of an alpha-beta-unsaturated acid containing 3 to 4 carbon atoms, the alkyl portion of said alkylate containing from 1 to 18 carbon atoms, and
   (c) about 4.5 to about 20 parts by weight from allyl alcohol and thereafter recovering the said tall-oil soap from said liquor.

2. A method as defined in claim 1, wherein said terpolymer consists essentially of units which are:
   (a) about 75 to about 88 parts by weight from an alpha-beta-unsaturated acid containing 3 to 4 carbon atoms,
   (b) about 6 to about 15 parts by weight from an alkylate of an alpha-beta-unsaturated acid containing 3 to 4 carbon atoms, the alkyl portion of said alkylate containing from 1 to 18 carbon atoms, and (c) about 6 to about 15 parts by weight from allyl alcohol.

3. A method as defined in claim 2, wherein said alpha-beta-unsaturated acid containing 3 to 4 carbon atoms is one selected from the group consisting of acrylic acid, methacrylic acid, crotonic acid, and isocrotonic acid.

4. A method as defined in claim 3 wherein said alpha-beta-unsaturated acid is acrylic acid.

5. A method as defined in claim 1 wherein said alkylate has an alkyl portion containing 1 to 10 carbon atoms.

6. A method as defined in claim 5 wherein said terpolymer consists essentially of units which are:

(a) about 75 to about 88 parts by weight from an alpha-beta-unsaturated acid containing 3 to 4 carbon atoms, (b) about 6 to about 15 parts by weight from an alkylate of an alpha-beta-unsaturated acid containing 3 to 4 carbon atoms, and (c) about 4.5 to about 20 parts by weight from allyl alcohol.

7. A method as defined in claim 6, wherein said alpha-beta-unsaturated acid containing 3 to 4 carbon atoms is one selected from the group consisting of acrylic acid, methacrylic acid, crontonic acid, and isocrotonic acid.

8. A method as defined in claim 7, wherein said alpha-beta-unsaturated acid is acrylic acid.

* * * * *